Patented Dec. 28, 1943

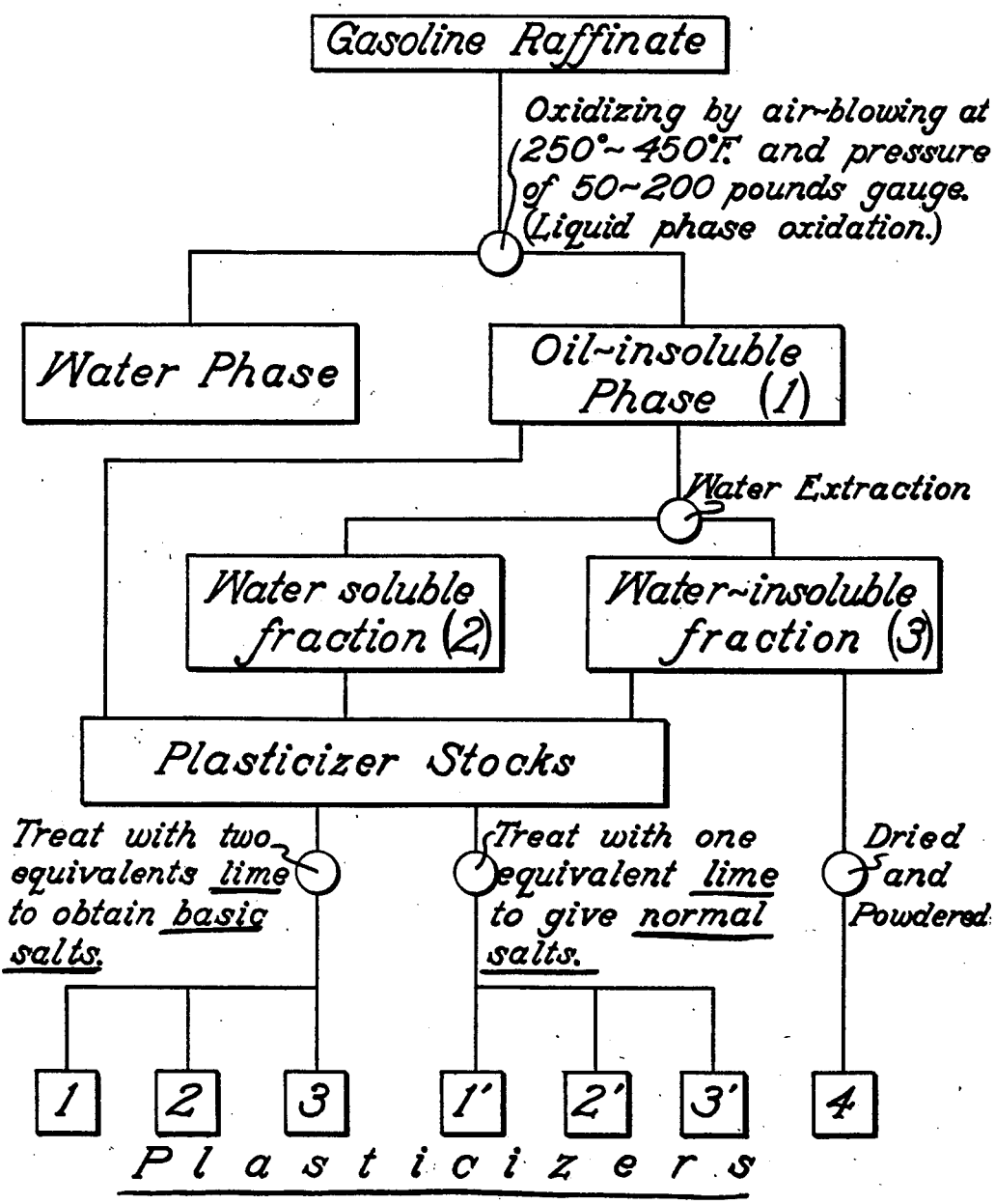

2,337,671

UNITED STATES PATENT OFFICE 2,337,671

PLASTICIZER

Hooper Linford and Arthur L. Blount, Palos Verdes Estates, Calif., assignors to Union Oil Company of California, Los Angeles, Calif., a corporation of California Application July 1, 1940, Serial No. 343,374

13 Claims. (Cl. 106—95)

This invention relates to a new plasticizer for Portland cement mortar, such as that used subsequently in making stucco or similar plasters. The invention also includes the method of producing the plasticizer and the method of plasticizing Portland cement.

To prepare a satisfactory stucco or masonry cement mortar it is necessary to include in the mixture a plasticizing agent, so that the mortar may be easily applied to the surface to be stuccoed, since otherwise a quantity of water must be used which will make the stucco of too thin a consistency and running will result. Lime, of course, is a very inexpensive plasticizer, but when the mortar is applied to exterior surfaces the lime leaches out over a period of time, resulting in plastering of interior quality and stains are produced due to effluorescence, making an unsightly appearance.

It is an object of our invention to provide a substance which will eliminate any detrimental effects due to leaching in view of, (1) the very small quantity which will be needed, and (2) its insolubility.

It is a further object to utilize the oil-insoluble phase obtained from the oxidation of gasoline, kerosene, gas oil or lubricating oil fractions as a plasticizer for stucco and masonry mortars.

Briefly, our invention consists of preparing the alkali or alkaline earth salts, preferably the calcium salt of the oil-insoluble portion of the oxidized bottoms of a kerosene, gasoline, lubricating oil or gas oil or raffinates thereof for use in plasticizing any type of Portland cement mortar. The water-insoluble portion of the oil-insoluble fraction of the gasoline raffinate may also be reserved for use as a plasticizer.

The gasoline, kerosene, lubricating oil or gas oil raffinate is oxidized at a suitable temperature, in the range of 250° F. to 450° F., with air at a gauge pressure of 50 to 200 pounds. The oxidation bottoms so obtained consist partly or entirely of an oil-insoluble phase which, depending on the stock and the extent of oxidation, may amount to as much as 40% to 50% by weight of the original petroleum fraction. If a straight petroleum distillate is to be employed instead of the raffinate, a catalyst, such as magnesium oxide, is used in the oxidation to obtain the same oil-insoluble phase. This phase is separated and may be treated in a number of ways to give seven products, all of which are excellent cement mortar plasticizers. These are prepared in the following manner:

The oil-insoluble phase is extracted with a suitable quantity of water, leaving a water-insoluble, oil-insoluble fraction. This latter fraction may be used directly as a plasticizer. Either the whole oil-insoluble phase or each of its water-soluble and water-insoluble fractions may be converted into the calcium salts. To accomplish this, these fractions are dissolved in a small quantity of an oxygenated solvent, such as acetone, ethyl methyl ketone or isopropyl alcohol, etc., and the calculated amount of water slaked lime added, either as a dry powder or as a slurry in the solvent, and mixed rapidly. After removing the solvent from the salt the product is ground and screened to any necessary fineness.

The quantity of calcium hydroxide added may vary from one to two equivalents per equivalent acid present in the stock plasticizer.

After thus obtaining the plasticizer in a convenient form, it may be added to the Portland cement before crushing either the cement or the plasticizer, or each may be powdered separately and then mixed or the plasticizer may be added to the mortar itself.

On adding any of these plasticizers to a cement mortar prepared from one part of Portland cement and two to five parts of sand using as little water as possible, a definite plasticizing action is observed. We have found that small quantities of plasticizer, preferably about 0.15% to 0.4% by weight of the Portland cement, produced a mortar that was not only more plastic than the blank prepared without the use of a plasticizer, but also was more plastic than the mortar which contained an equal amount of a commercially available product. More or less plasticizer may be used, depending on the plasticizing action desired.

An example of the process is as follows:

The gasoline raffinate used in this particular example was a fraction of that obtained on treating crude gasoline, boiling point 170° F. to 380° F., with 115 volume percent liquid sulphur dioxide at +17° F. The fraction actually used was the 25% to 50% cut of the above raffinate and had a boiling point range of 235° F. to 256° F. and consisted of 51% paraffin hydrocarbons, 47% naphthene hydrocarbons and 2% aromatic hydrocarbons.

Eighty pounds of this gasoline raffinate was placed in a chamber of stainless steel, consisting of a tube 8 inches in diameter and 9.3 feet high fitted with a condenser, a dephlegmator with a return line to the chamber and a water-cooled condenser for removing water and light acids from the exit gases. Air entered the chamber through a 6 inch diameter stainless steel plate, drilled with 97 holes of 0.016 inch diameter, which was supported 4 inches above the bottom of the unit. The temperature was controlled manually by means of steam and/or water in a steam jacket to a temperature between 300° F. to 320° F. and while being heated the pressure was adjusted to 105 pounds gauge. Air was introduced at the rate of 4 cubic feet per minute for fifty hours. This treatment yielded 83.8 pounds of an aqueous phase consisting of low molecular weight aliphatic acids, aldehydes, ketones and esters and an oil-insoluble phase 1 weighing 30.5 pounds. This latter phase consisted primarily of acids and esters and had an acid number of 253 mg. KOH/g. The oil-insoluble phase was then extracted with boiling water to obtain a water-soluble fraction 2 and a water-insoluble fraction 3. (See diagram.)

In preparing plasticizers from these fractions, part of the water-insoluble fraction was dried on a steam bath, and after powdering was a suitable substance for mixing with cement without further treatment. The other part of the water-insoluble acid product was dissolved in an equal weight of acetone and this solution treated with either one or two equivalents of lime. For example, the preparation of a salt of the water-insoluble, oil-insoluble fraction, 280 grams of the material were dissolved in 280 grams of acetone to which was added a slurry of 92.9 grams of lime in a small quantity of acetone. The mixture was stirred rapidly and heated on a steam bath for twenty minutes, or until the reaction was complete. The calcium salts of the water-soluble fraction and of the total oil-insoluble phase were prepared in the same manner.

In testing the plasticizing action of these materials one part of a mixture of the calcium salt (0.1% to 0.4% by weight) and Portland cement was mixed with three parts of sand, and to this an amount of water equivalent to 7.5 gallons per sack of cement was added. A like sample was prepared without using the calcium salt. Given the two samples, one could easily determine manually that the one containing the calcium salt was more plastic.

The acids which have been previously described are of the oil-insoluble type. We wish it to be understood that one may also employ oil-soluble oxidized acids. For example, when gas oil or lubricating oil or other heavy hydrocarbons are oxidized a substantial portion of oil-soluble acids are formed which may be used in the form of the acid or converted into salts, as described above and employed as plasticizers for cement mortar.

The foregoing description of our invention is not to be considered as limiting since many variations may be made by those skilled in the art without departing from the spirit thereof.

We claim:

1. A composition of matter comprising Portland cement and a small quantity of a complex mixed oil-insoluble organic acid fraction produced by oxidizing petroleum hydrocarbons as a plasticizer therefor.

2. A composition of matter comprising Portland cement, water and a small quantity of complex mixed oil-insoluble organic acids produced by oxidizing petroleum hydrocarbons as a plasticizer therefor.

3. A composition of matter which comprises Portland cement and a salt of complex mixed oil-insoluble organic acids produced by oxidizing a petroleum hydrocarbon fraction as a plasticizer therefor.

4. A composition of matter which comprises Portland cement containing a small quantity of an alkaline earth metal salt of the oil-insoluble complex mixed organic acids produced by oxidizing a petroleum hydrocarbon fraction as a plasticizer therefor.

5. A composition of matter which comprises Portland cement containing a small quantity of an alkali metal salt of complex mixed oil-insoluble organic acids produced by oxidizing a petroleum hydrocarbon fraction as a plasticizer therefor.

6. A composition of matter which comprises Portland cement containing a small quantity of calcium salt of complex mixed oil-insoluble organic acids produced by oxidizing a petroleum hydrocarbon fraction as a plasticizer therefor.

7. A process of plasticizing Portland cement mortar which comprises adding to the cement a small quantity of complex mixed oil-insoluble organic acids produced by the oxidation of a hydrocarbon fraction having a boiling range of approximately 235° F. to 256° F. and consisting essentially of 51% of paraffin hydrocarbons, 47% of naphthene hydrocarbons and 2% of aromatic hydrocarbons.

8. A process of plasticizing Portland cement mortar which comprises adding to the cement a small quantity of a salt of complex mixed oil-insoluble organic acids produced by oxidizing petroleum.

9. A process as claimed in claim 8 in which the salt contains a metal of the alkaline earth group.

10. A process as claimed in claim 8 in which the salt contains a metal of the alkali group.

11. A process as claimed in claim 8 in which there is added to the Portland cement from 0.1% to 0.4% of the calcium salt of complex mixed oil-insoluble acids produced by oxidizing petroleum hydrocarbons.

12. A composition of matter comprising Portland cement and a small quantity of an oil-insoluble complex mixed acid material obtained by oxidizing petroleum hydrocarbons as a plasticizer therefor.

13. A process of plasticizing Portland cement mortar which comprises adding to the mortar a small quantity of an oil-insoluble complex mixed acid material obtained by oxidizing petroleum hydrocarbons.

HOOPER LINFORD.
ARTHUR L. BLOUNT.